United States Patent
Jeong

(10) Patent No.: US 10,860,498 B2
(45) Date of Patent: Dec. 8, 2020

(54) DATA PROCESSING SYSTEM

(71) Applicant: SK hynix Inc., Icheon (KR)

(72) Inventor: Seung Gyu Jeong, Gwangmyeong (KR)

(73) Assignee: SK hynix Inc., Icheon (KR)

( * ) Notice: Subject to any disclaimer, the term of this patent is extended or adjusted under 35 U.S.C. 154(b) by 0 days.

(21) Appl. No.: 16/288,015

(22) Filed: Feb. 27, 2019

(65) Prior Publication Data

US 2020/0159671 A1 May 21, 2020

(30) Foreign Application Priority Data

Nov. 21, 2018 (KR) ........................ 10-2018-0144288

(51) Int. Cl.
| | | |
|---|---|---|
| *G06F 12/12* | (2016.01) | |
| *G06F 12/123* | (2016.01) | |
| *G06F 12/0871* | (2016.01) | |
| *G06F 12/0804* | (2016.01) | |
| *G06F 12/126* | (2016.01) | |

(52) U.S. Cl.
CPC ........ *G06F 12/123* (2013.01); *G06F 12/0804* (2013.01); *G06F 12/0871* (2013.01); *G06F 12/126* (2013.01)

(58) Field of Classification Search
USPC ....................................................... 711/136
See application file for complete search history.

(56) References Cited

U.S. PATENT DOCUMENTS

| | | | |
|---|---|---|---|
| 5,434,533 A * | 7/1995 | Furutani | ................. G05F 1/463 327/538 |
| 5,717,884 A * | 2/1998 | Gzym | ................. G06F 12/0866 711/206 |
| 7,206,902 B2 | 4/2007 | Hakura et al. | |
| 8,095,738 B2 | 1/2012 | Benhase et al. | |
| 8,200,911 B2 | 6/2012 | Jeong | |
| 8,792,511 B2 | 7/2014 | Raikar et al. | |
| 8,819,390 B1 | 8/2014 | Sivasubramanian et al. | |
| 9,218,285 B2 * | 12/2015 | Udipi | ....................... G11C 7/04 |
| 9,432,298 B1 | 8/2016 | Smith | |

(Continued)

FOREIGN PATENT DOCUMENTS

| | | |
|---|---|---|
| KR | 20140067740 | 6/2014 |
| KR | 20190074823 A | 6/2019 |

OTHER PUBLICATIONS

Somogyi, et al., "Spatio-Temporal Memory Streaming," ISCA, Proceedings of the 36th Annual International Symposium on Computer Architecture, 2009, pp. 12.

*Primary Examiner* — Ilwoo Park

(57) ABSTRACT

A data processing system is disclosed, which relates to a technology for implementing a convergence memory system provided with a plurality of memories. The data processing system includes a compute blade configured to generate a write command to store data and a read command to read the data, and a memory blade configured to selectively performed read and write operations in response to the read and write commands in a plurality of memories. The compute blade has a memory that stores information about performance characteristics of each of the plurality of memories, and is configured to determine priority information through which eviction of a cache line is carried out based on the stored information.

14 Claims, 8 Drawing Sheets

(56) References Cited

U.S. PATENT DOCUMENTS

| | | |
|---|---|---|
| 9,612,975 B2 | 4/2017 | Li |
| 2005/0195635 A1 | 9/2005 | Conley et al. |
| 2006/0041723 A1 | 2/2006 | Hakura et al. |
| 2009/0089466 A1 | 4/2009 | Cunningham et al. |
| 2012/0311269 A1* | 12/2012 | Loh ..................... G06F 12/126 711/133 |
| 2013/0262732 A1 | 10/2013 | Tanabata |
| 2014/0048947 A1 | 2/2014 | Lee et al. |
| 2014/0115225 A1* | 4/2014 | Chandrakar ........ G06F 12/0802 711/3 |
| 2014/0149694 A1 | 5/2014 | Lee et al. |
| 2014/0176187 A1 | 6/2014 | Jayasena et al. |
| 2014/0181417 A1 | 6/2014 | Loh et al. |
| 2014/0181458 A1 | 6/2014 | Loh et al. |
| 2014/0379995 A1 | 12/2014 | Kwon et al. |
| 2015/0039968 A1 | 2/2015 | Orion |
| 2016/0055089 A1 | 2/2016 | Kim et al. |
| 2018/0129613 A1* | 5/2018 | Faldu .................. G06F 12/0891 |
| 2018/0276126 A1 | 9/2018 | Ito |
| 2018/0300265 A1 | 10/2018 | Roberts et al. |
| 2019/0042437 A1* | 2/2019 | Guim Bernat ...... G06F 12/0862 |

\* cited by examiner

DATA PROCESSING SYSTEM

CROSS-REFERENCE TO RELATED APPLICATION

This application claims priority based upon Korean patent application No. 10-2018-0144288, filed on Nov. 21, 2018, the disclosure of which is hereby incorporated in its entirety by reference herein.

BACKGROUND OF THE INVENTION

1. Technical Field

Embodiments of the present disclosure may generally relate to a data processing system, and more particularly to a technology for implementing a convergence memory system provided with a plurality of memories.

2. Related Art

In recent times, various mobile communication terminals, for example, smartphones, tablet PCs, etc. have been widely used throughout the world. In addition, demand for a Social Network Service (SNS), a Machine to Machine (M2M) service, a sensor network, etc. accessible from anywhere at any time is rapidly increasing. Therefore, the amount of data, the speed of creating data, and diversity of data are geometrically increasing. In order to process increasing quantities of data, data processing rates of memory are important, and a high-capacity memory device and a high-capacity memory module are also needed.

Therefore, a memory system includes a plurality of memory devices to increase storage capacity. However, the plurality of memory devices contained in the memory system may have different memory characteristics. Therefore, when cache management is executed in the memory system, memory devices with different memory characteristics can cause access errors, resulting in miss penalties in a memory system.

BRIEF SUMMARY OF THE INVENTION

Various embodiments of the present disclosure are directed to providing a data processing system that substantially obviates one or more issues due to limitations and disadvantages of the related art.

The embodiments of the present disclosure relate to a memory system for assigning priority information in response to memory characteristics during eviction of one or more cache lines, resulting in reduction in a miss penalty.

In accordance with an embodiment of the present disclosure, a data processing system includes a compute blade configured to generate a write command needed to store data and a read command needed to read the data, and a memory blade configured to selectively perform read and write operations in response to the read and write commands in a plurality of memories. The compute blade has a cache memory that stores information about performance characteristics of each of the plurality of memories, and is configured to determine priority information through which eviction of a cache line is carried out based on the stored information.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The above and other features and advantages of the present disclosure will become readily apparent by reference to the following detailed description when considered in conjunction with the accompanying drawings wherein.

DESCRIPTION OF EMBODIMENTS

Reference will now be made in detail to embodiments of the present disclosure, examples of which are illustrated in the accompanying drawings. Wherever possible, the same reference numbers are used throughout the drawings to refer to the same or like portions. Throughout the specification of the present disclosure, if it is assumed that a certain part is connected (or coupled) to another part, the term "connection or coupling" means that the certain part is directly connected (or coupled) to another part and/or is electrically connected (or coupled) to another part through the medium of a third party. Throughout the specification of the present disclosure, if it is assumed that a certain part includes a certain component, the term "comprising or including" means that a corresponding component may further include other components unless a specific meaning opposed to the corresponding component is written. As used in the specification and appended claims, the terms "a", "an", "one", "the" and other similar terms include both singular and plural forms, unless context clearly dictates otherwise. The terms used in the present application are merely used to describe specific embodiments and are not intended to limit the present disclosure. A singular expression may include a plural expression unless otherwise stated in the context.

Figure 1:
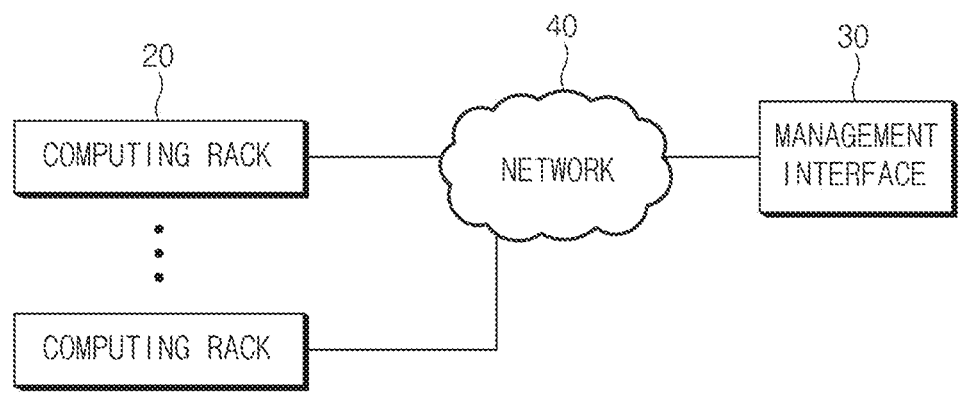
FIG. 1 is a block diagram illustrating an example of a data processing system according to an embodiment of the present disclosure.

FIG. 1 is a block diagram illustrating an example of a data processing system 10 according to an embodiment of the present disclosure.

Referring to FIG. 1, the data processing system 10 may include a plurality of computing racks 20, a management interface 30, and a network 40 through which the computing racks 20 and the management interface 30 can communicate with each other. The data processing system 10 provided with such a rack-scale architecture may be used in a data center for processing a large amount of data, or the like.

Each of the computing racks 20 may independently implement a single computing device. Alternatively, each of the computing racks 20 may be combined with other computing racks, resulting in implementation of a single computing device.

Detailed constituent elements and operations of the computing racks 20 will be described later with reference to the attached drawings.

The management interface 30 may provide an interactive interface through which a user can coordinate, administer, or manage the data processing system 10. The management interface 30 may be implemented as an arbitrary computing device including various kinds of devices, for example, a computer, a system, a server, a rack-mount server, a blade server, a laptop, a tablet PC, a wearable computing device, a network device, a Web device, a distributed computing system, a processor based system, and/or a consumer electronic device.

In accordance with one embodiment, the management interface 30 may be implemented as a distributed system having either compute functions capable of being executed by the computing racks 20, or user interface (UI) functions capable of being executed by the management interface 30. In accordance with another embodiment, the management interface 30 may be implemented as a virtual server which is composed of multiple computing devices distributed through the network 40 and operates as a cloud device. In this case, the management interface 30 may include a processor, an input/output (I/O) sub system, a memory, a data storage device, and a communication circuit.

The network 40 may perform data communication between the management interface 30 and each of the computing racks 20, and/or may perform data communication between the computing racks 20. The network 40 may be a wired or wireless network, or have a combination of wired and wireless elements.

The network 40 may be a wired or wireless Local Area Network (LAN), a Wide Area Network (WAN) cellular network, and/or a publicly-accessible global network such as the Internet. In addition, the network 40 may include a number of network devices such as computers, routers, switches, etc.

Figure 2:
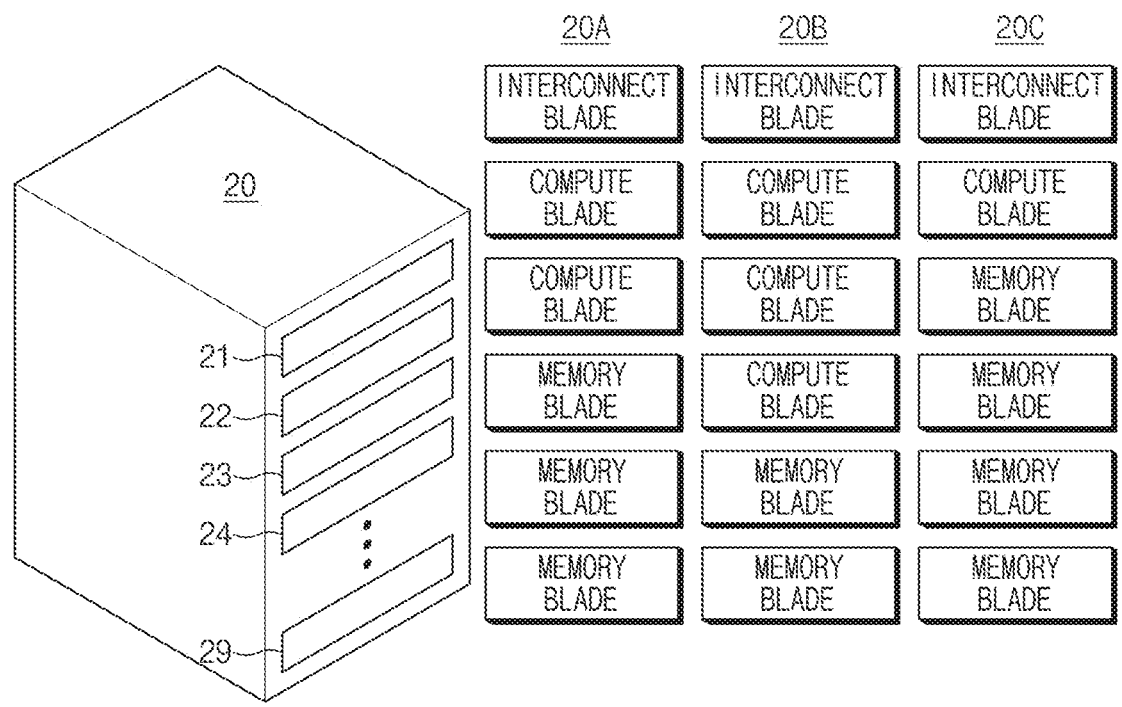
FIG. 2 is a block diagram illustrating an example of a computing rack shown in FIG. 1 according to an embodiment of the present disclosure.

FIG. 2 is a block diagram illustrating a computing rack shown in FIG. 1 according to an embodiment of the present disclosure.

Referring to FIG. 2, the scope of the computing rack 20 is not limited to the specific structures, shapes, names, etc. shown in the figure, and it should be noted that the computing rack 20 may include various components. For example, the computing rack 20 may include a plurality of drawers 21 to 29. Each of the drawers 21 to 29 may include a plurality of modules, and each of the modules may include a plurality of blades.

In accordance with one embodiment, the computing rack 20 may be implemented by a combination of one or more compute blades, one or more memory blades, and/or one or more interconnect blades. Although the term "computing rack" is used by the present disclosure to refer to a combination of the plurality of blades, it should be noted that the computing rack may also be referred to as by other names, for example, drawers, modules, trays, boards, chassis, units, or the like.

The components of a computing rack 20 may be sorted or classified according to their functions. Although the scope of the present disclosure is not limited to any specific embodiment, the computing rack 20 may include one interconnect blade, at least one compute blade, and at least one memory blade in a downward direction.

In various embodiments, a computing device may be implemented by a single computing rack 20. Alternatively, the computing device may be implemented by all blades contained in at least two computing racks 20, by a combination of a portion of the blades contained in at least two computing racks 20, or a portions of the blades in a single computing rack 20.

In accordance with various embodiments, the computing device may be implemented by a combination of compute blades, memory blades, and interconnect blades contained in the computing rack 20. For example, the computing device 20A may include a combination of two compute blades, three memory blades, and a single interconnect blade. In another example, the computing device 20B may include a combination of three compute blades, two memory blades, and a single interconnect blade. In yet another example, the computing device 20C may include a combination of a single compute blade, four memory blades, and a single interconnect blade.

Although FIG. 2 illustrates a computing rack 20 that includes a plurality of compute blades, memory blades, and interconnect blades, the scope of the present disclosure is not limited thereto. The computing rack 20 may include additional constituent elements that are present in a general server, for example, a power system, a cooling system, input/output (I/O) devices, etc.

Figure 3:
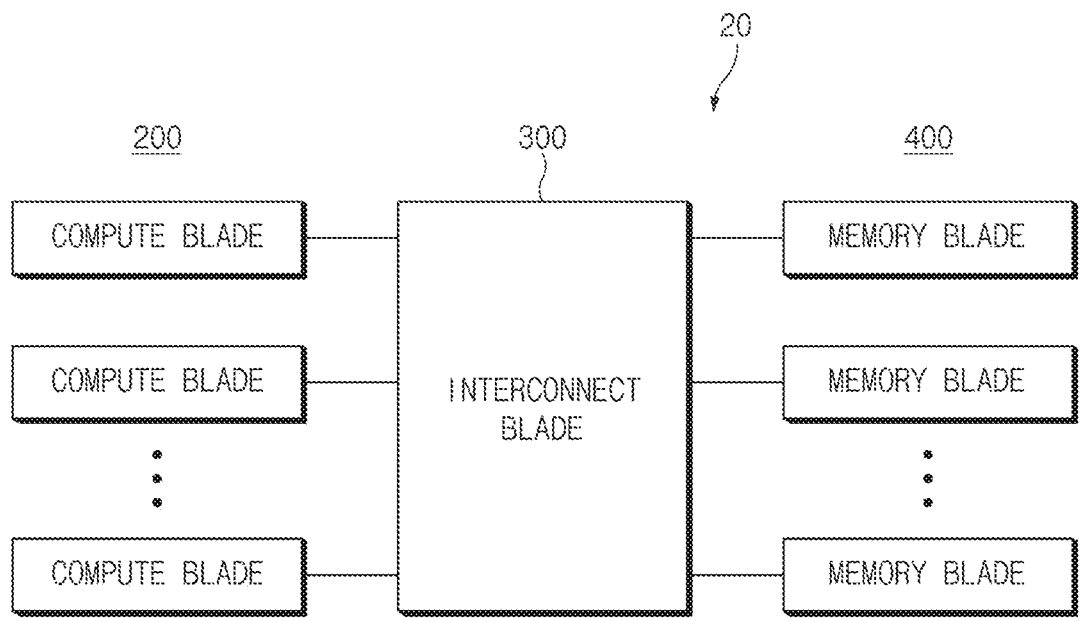
FIG. 3 is a block diagram illustrating an example of a computing rack shown in FIG. 1 according to an embodiment of the present disclosure.

FIG. 3 is a block diagram illustrating the computing rack 20 shown in FIG. 1 according to an embodiment of the present disclosure.

Referring to FIG. 3, the computing rack 20 may include a plurality of compute blades 200, an interconnect blade 200, and a plurality of memory blades 400.

In this case, the plurality of compute blades 200 may be referred to as pooled compute blades, pooled compute systems, or the like. Similarly, the plurality of memory blades 400 may also be referred to as pooled memory blades, pooled memory system, or the like. Each of the compute blades 200 may generate a write command to store data and a read command to read data. Each compute blade 200 may include at least one processing element, for example, at least one processor, at least one processing/control circuit, or at least one central processing unit (CPU).

Each of the memory blades 400 may selectively perform a read or write operation of data in response to a read command or a write command. In more detail, each memory blade 400 may perform a read operation to read data in response to the read command, and may perform the write operation to write data in response to the write command. Each memory blade 400 may include various types of memories, for example, a plurality of volatile memories and/or a plurality of non-volatile memories.

In an embodiment, each of the memory blades 400 may include a plurality of Dynamic Random Access Memories (DRAMs), flash memories, memory cards, Hard Disk Drives (HDDs), Solid State Drives (SSDs), or a combination thereof.

Each of the memory blades 400 may be divided, allocated, or designated by one or more processors contained in each compute blade 200. Each memory blade 400 may store at least one operating system (OS) capable of being initialized and/or performed by the compute blades 200.

The interconnect blade 300 may have a plurality of network interface ports, cards, or switches. The interconnect blade 300 may use protocols related to one or more wired or wireless communication technologies. For example, the interconnect blade 300 may support data communication between each of the compute blades 200 and each of the memory blades 400 according to various protocols such as Peripheral Component Interconnect Express (PCIe), QuickPath Interconnect (QPI), Ethernet, and the like.

A server system or a data processing system, such as a data center, may have a plurality of blades (e.g., compute blades 200, memory blades 400, etc.) mounted into a unit computing rack 20 while simultaneously being distinguished from one another within the computing rack 20. A single memory blade or multiple memory blades may be implemented as a convergence memory device in which the same or different kinds of memories are provided, or may also be implemented as a pooled memory system.

Figure 4:
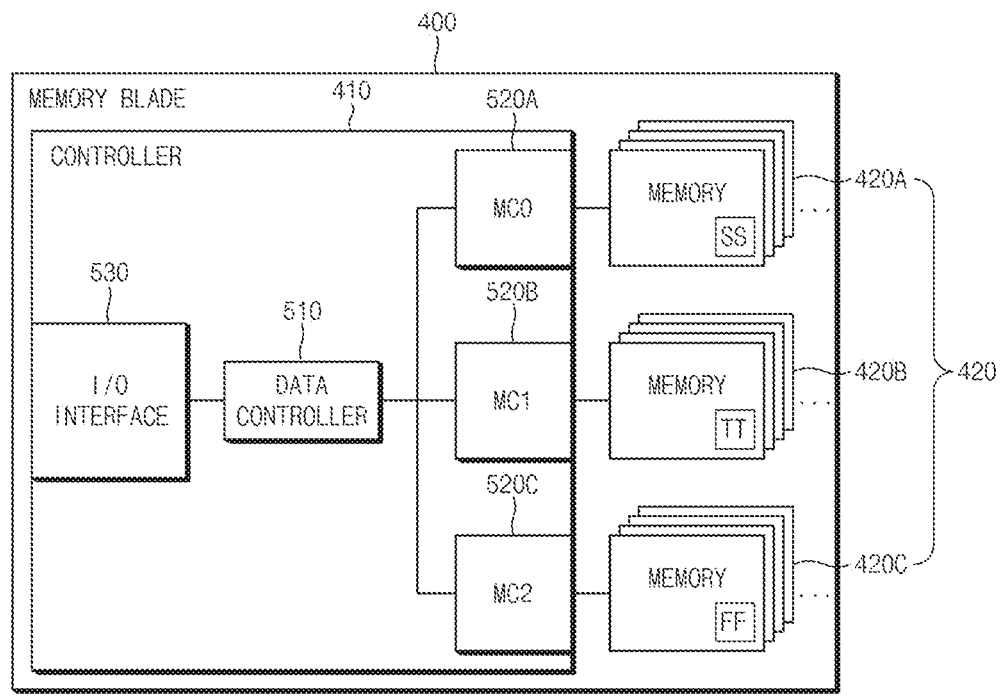
FIG. 4 is a schematic diagram illustrating an example of a memory blade shown in FIG. 3 according to an embodiment of the present disclosure.

FIG. 4 is a schematic diagram illustrating each memory blade shown in FIG. 3 according to an embodiment of the present disclosure.

Referring to FIG. 4, the memory blade 400 may include a controller 410 and a plurality of memories 420.

The controller 410 may include a data controller 510, a plurality of memory controllers 520A-520C, and an Input/Output (I/O) interface 530.

The data controller 510 may control data which is communicated between the compute blades 200 shown in FIG. 3 and the memories 420. For example, the data controller 510 may receive data to be written, from the compute blades 200 in response to a write request or a write command. The data controller 510 may control the write operation for writing the received data in a corresponding memory from among the plurality of memories 420. In another example, the data controller 510 may read data stored in a specific memory from among the plurality of memories 420 in response to a read request or a read command from the compute blades 200. The data controller 510 may control a read operation for outputting read data to the corresponding compute blade from among the compute blades 200.

The memory controllers 520A~520C may be disposed between the data controller 510 and the plurality of memories 420, and may provide an interface between the data controller 510 and the memories 420. The memory controller 520A may control operations of a first group of memories 420A contained in the plurality of memories 420. The memory controller 520B may control operations of a second group of memories 420B contained in the plurality of memories 420. The memory controller 520C may control operations of a third group of memories 420C contained in the plurality of memories 420.

Accordingly, the memory controller 520A may be disposed between the data controller 510 and the first group of memories 420A, and may support data communication between the data controller 510 and the first group of memories 420A. The memory controller 520B may be disposed between the data controller 510 and the second group of memories 420B, and may support data communication between the data controller 510 and the second group of memories 420B. The memory controller 520C may be disposed between the data controller 510 and the third group of memories 420C, and may support data communication between the data controller 510 and the third group of memories 420C.

As can be seen from FIG. 4, the controller 410 may exemplarily include three memory controllers 520A-520C for convenience of description. However, the scope of the present disclosure is not limited thereto. In some embodiments, the controller 410 has one memory controller 520 for each type of memory 420. If the first-group memories 420A, the second-group memories 420B, and the third-group memories 420C are the same kind of memories, the controller 410 may have a single memory controller.

The I/O interface 530 may provide an interface between the data controller 510 and the compute blades 200 through the interconnect blade 300. The I/O interface 530 may transmit (Tx) data received from the data controller 510 to the interconnect blade 300 using protocols related to at least one wired or wireless communication technology, and may receive (Rx) data from the interconnect blade 300 and transmit the receive data to the data controller 510.

For example, the I/O interface 530 may support data communication between the data controller 510 and the interconnect blade 300 according to various protocols such as Peripheral Component Interconnect Express (PCIe), QuickPath Interconnect (QPI), Ethernet, and the like.

In response to a control signal received from the controller 410, the plurality of memories 420 may store (or write) data, or may output (or read) the stored data. The plurality of memories 420 may include the first-group memories 420A, the second-group memories 420B, and the third-group memories 420C. The first-group memories 420A, the second-group memories 420B, and the third-group memories 420C may have the same or different characteristics.

In accordance with some embodiments, the first-group memories 420A, the second-group memories 420B, and the third-group memories 420C may have the same or different latency characteristics.

For example, the first-group memories 420A, the second-group memories 420B, and the third-group memories 420C may be DRAM memories with the same characteristics. Alternatively, the first-group memories 420A, the second-group memories 420B, and the third-group memories 420C may be another type of memories, for example, Static Random Access Memories (SRAMs) or flash memories. In addition, the first-group memories 420A, the second-group memories 420B, and the third-group memories 420C may also be implemented as different types of memories.

In accordance with other embodiments, the same kind of memories 420, e.g., volatile memories (DRAMs), contained in the memory blade 400 may share or indicate various performance characteristics according to various temperature environments. In this case, the performance characteristics may include data access speed, a refresh period, or an amount of On-Chip leakage.

That is, the first-group memories 420A, the second-group memories 420B, and the third-group memories 420C may be in different temperature environments. The first-group memories 420A may operate in a first temperature environment, e.g., a room-temperature environment. The second-group memories 420B may operate in a second temperature environment, e.g., a low-temperature environment. The third-group memories 420C may operate in a third temperature environment, e.g., an ultralow-temperature (cryogenic) environment.

For example, when the third-group memories 420C operate in the cryogenic environment, the operating speed of the volatile memories (e.g., DRAMs) may be faster. In addition, as the amount of on-chip leakage decreases, the refresh period may be extended, thereby reducing a total amount of energy consumed by the volatile memory used in the cryogenic environment. As described above, the volatile memory used in the cryogenic environment may have the same characteristics as the non-volatile memory. In an embodiment, in response to a request signal requesting the best system performance, the third-group memories 420C disposed in the cryogenic environment may be selected from among the plurality of memories 420. As a result, the memory blade 400 shown in FIG. 4 may more quickly cope with a request signal (e.g., an urgent request signal) having a relatively higher priority, and at the same time may greatly reduce power consumption.

If a request signal requesting satisfactory system performance is received by a memory controller, the second-group memories 420B may be selected. In addition, when the first-group memories 420A operate in a higher temperature environment such as the room-temperature environment, the operation speed of the volatile memory is reduced. As the amount of on-chip leakage increases, power consumption may also increase in proportion to the increasing on-chip leakage.

Therefore, the first-group memories 420A, the second-group memories 420B, and the third-group memories 420C may be used in environments of various temperatures, resulting in implementation of various performance characteristics. Therefore, the first-group memories 420A may be set to memories operating in the room-temperature environment, each of which has first characteristics (e.g., slow characteristics: SS) corresponding to a slow operation speed. The second-group memories 420B may be set to memories operating in the low-temperature environment, each of which has second characteristics (e.g., normal characteristics: TT) corresponding to a normal operation speed. The third-group memories 420C may be set to memories operating in the ultralow-temperature (cryogenic) environment, each of which has third characteristics (e.g., fast characteristics: FF) corresponding to a fast operation speed.

Figure 5:
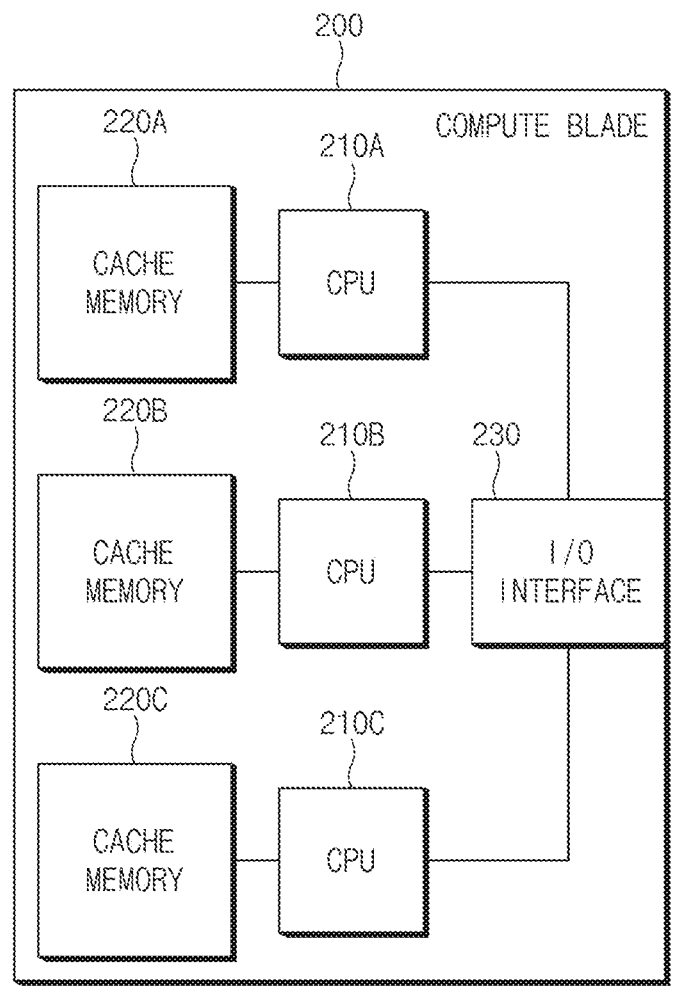
FIG. 5 is a schematic diagram illustrating an example of a compute blade shown in FIG. 3 according to an embodiment of the present disclosure.

FIG. 5 is a schematic diagram illustrating the compute blade shown in FIG. 3 according to an embodiment of the present disclosure.

Referring to FIG. 5, the compute blade 200 may include one or more CPUs 210A-210C, one or more cache memories 220A-220C, and an I/O interface 230.

Each of the CPUs 210A-210C may generate a command for controlling at least one memory blade 400. Each of the CPUs 210A-210C may be used to divide, allocate, or designate at least one memory blade 400 from among the plurality of memory blades 400 shown in FIG. 3. Each of the CPUs 210A-210C may initialize at least one divided, allocated, or designated memory blade 400. Each of the CPUs 210A-210C may control the read or write operation (or the read or write program) performed in the plurality of memory blades 400.

For latency reduction, the cache memory 220A may store data for the CPU 210A, the cache memory 220B may store for the CPU 210B, and the cache memory 220C may store data for the CPU 210C. The cache memories 220A-220C may store data used to operate the CPUs 210A-210C in cache lines, and may determine priority information for each memory in which an eviction operation is performed according to characteristics of the respective memories 420. In accordance with one embodiment, the cache memories 220A-220C may be coupled to the CPUs 210A-210C on a one to one basis. For example, the cache memories 220A-220C may be disposed on respective processor dies for CPUs 210A-210C.

The I/O interface 230 may support communications between the memory blades 400 and the CPUs 210A-210C through the interconnect blade 300 shown in FIG. 3.

The I/O interface 230 may control data input/output (I/O) operations using protocols related to at least one wired or wireless communication technology. That is, the I/O interface 230 may output transmission (Tx) data received from the CPUs 210A-210C to the interconnect blade 300, and may transmit reception (Rx) data received from the interconnect blade 300 to the CPUs 210A-210C.

For example, the I/O interface 230 may support data communication between the interconnect blade 300 and the CPUs 210A-210C according to various protocols such as Peripheral Component Interconnect Express (PCIe), Quick-Path Interconnect (QPI), Ethernet, and the like.

Figure 6:
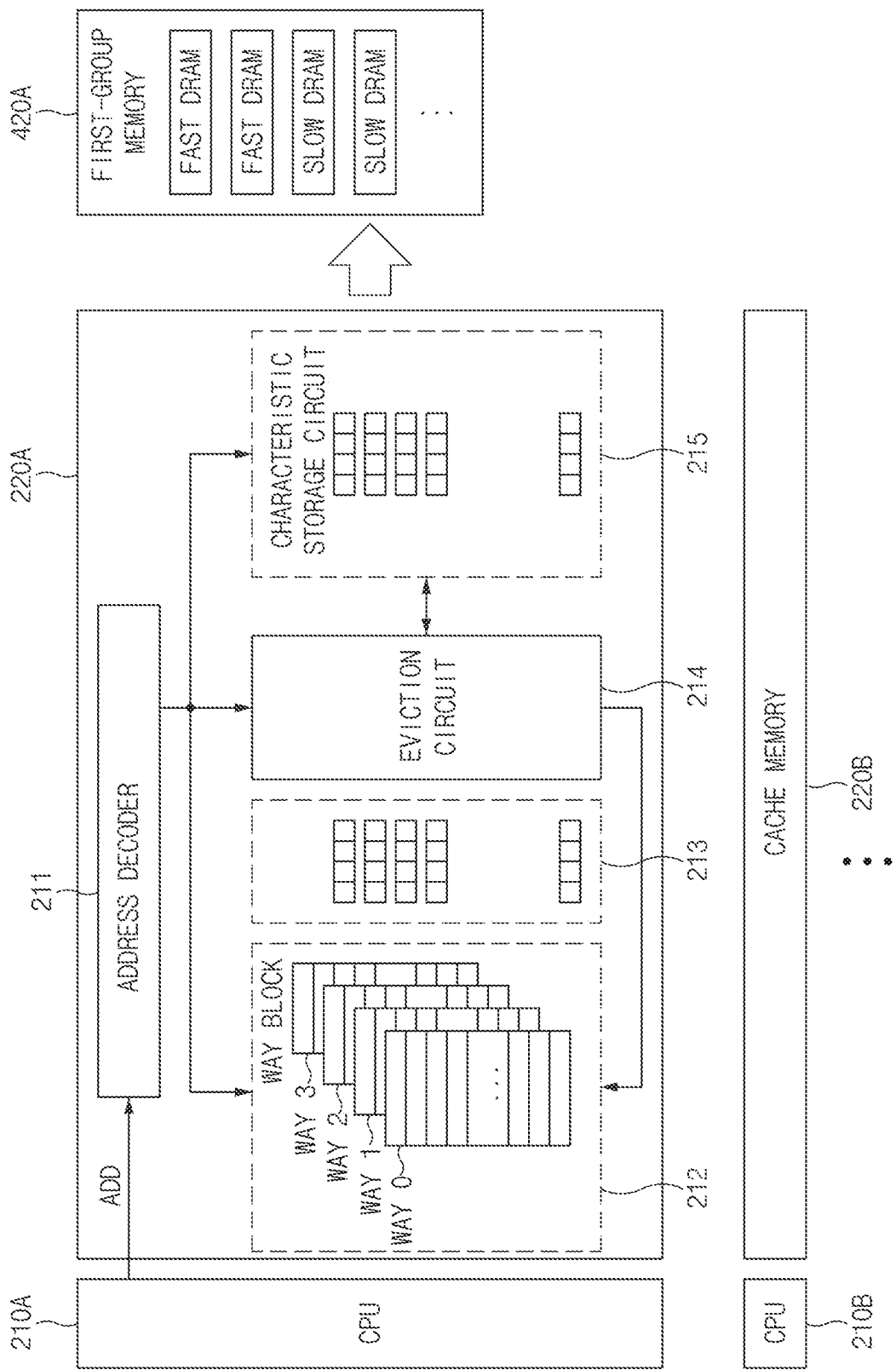
FIG. 6 is a schematic diagram illustrating an example of cache memories shown in FIG. 5 according to an embodiment of the present disclosure.

FIG. 6 is a schematic diagram illustrating the cache memories 220A and 220B shown in FIG. 5 according to an embodiment of the present disclosure. Since the cache memories 220A-220C in this example have the same structure, the following embodiment of the present disclosure will hereinafter be described with reference to detailed constituent elements of only one cache memory 220A from among the plurality of cache memories 220A-220C for convenience of description and better understanding of the present disclosure.

Referring to FIG. 6, the cache memory 220A may include an address decoder 211, a way block 212, a data processor 213, an eviction circuit 214, and a characteristic storage circuit 215.

In this case, the address decoder 211 may decode an address ADD received from the CPU 210A, such that the address decoder 211 may select the corresponding address of the way block 212, the eviction circuit 214, and the characteristic storage circuit 215. The way block 212 may include a plurality of ways WAY0-WAY3 to store data during the operation of the CPU 210A.

In this case, each of the ways WAY0~WAY3 may include a tag address, a dirty flag, and data. The address ADD requested from the CPU 210A may be created by a combination of a set number and a tag address. Therefore, in order to determine whether a value about the address ADD requested from the CPU 210A was stored in the cache memory 220A, the cache memory 220A may inquire about (or check) tag addresses of the plurality of ways WAY0~WAY3 contained in a set that is automatically decided by the requested address ADD. In an embodiment, a specific value (e.g., "0") may be allocated to the tag address, such that the tag address "0" may indicate an empty state of the corresponding way.

The dirty flag may indicate whether data stored in the cache memory 220A was stored in each of the memories 420. For example, the activated (or enabled) dirty flag may indicate that data stored in each of the ways WAY0-WAY3 has been updated and has not been stored in each of the memories 420. Therefore, if it is confirmed that a dirty flag of a way expelled from the cache memory 220A was activated (or enabled), the memories 420 can be updated using the activated data.

The data processor 213 may process data corresponding to a cache replacement policy. For example, the cache replacement policy may refer to an operation for replacing cache data using a Least Recently Used (LRU) operation or a First-In First-Out (FIFO) operation. In this case, the LRU operation may be a function for sequentially replacing the least recently used data to increase a hit rate. The FIFO operation may be a function for replacing data in the same order it was input.

The cache memory 220A may be characterized in that, when a cache full state is present due to limited space, the existing data (i.e., legacy data) should be deleted to load new data. To this end, based on operations of the data processor 213 in the cache full state, the eviction circuit 214 may delete data having a low probability that it will be referenced or write back the same data in a main memory, and then may replace data of the corresponding space with new data. An eviction circuit 214 according to an embodiment may determine priority information of each memory that performs eviction operations based on characteristic information stored in the characteristic storage circuit 215.

The characteristic storage circuit 215 may store characteristic information about the first-group memories 420A, characteristic information about the second-group memories 420B, and characteristic information about the third-group memories 420C. For example, the characteristic storage circuit 215 may store data access speed information about the above-mentioned first-group memories 420A. Assuming that each memory of the first-group memories 420A may include four DRAMs, the characteristic storage circuit 215 may store data access speed information of each of the four DRAMs contained in the first-group memories 420A. Two memories from among the four memories contained in the first-group memories 420A may have fast characteristics (FF) corresponding to the fast operation speed, and the remaining two memories may have slow characteristics (SS) corresponding to the slow operation speed.

In this case, the characteristic storage circuit 215 may store data access speed information for each memory as 1-bit data. For example, if a memory has fast characteristics (FF), data "0" may be stored in the characteristic storage circuit 215. If the memory has slow characteristics, data "1" may be stored in the characteristic storage circuit 215. In other embodiments, characteristics may be stored using a larger number of bits to designate larger numbers of graduations in a performance scale.

In a conventional process of evicting (or removing) cache data using only the hit rate of the data processor 213, a miss penalty is not considered at all. While using a hit rate does account for misses to a limited extent, e.g. a miss is an inverse of a hit, the miss penalty for those misses manifests as a delay that depends on a number of factors including memory performance characteristics. Therefore, a data processing system according to an embodiment of the present disclosure may store characteristic information of the memories 420 through the characteristic storage circuit 215. The data processing system may evict (or remove) cache data in consideration of the stored characteristics of the memories 420.

Figure 7:
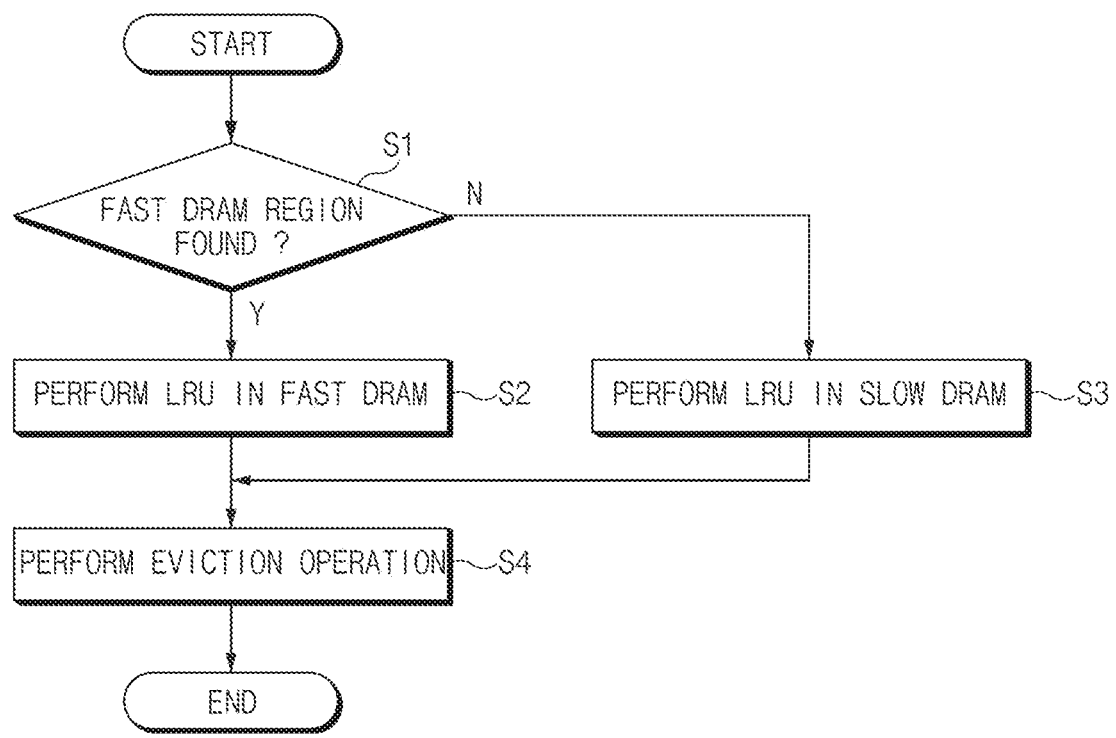
FIGS. 7 and 8 are flowcharts illustrating operations of an eviction circuit shown in FIG. 6 according to an embodiment of the present disclosure.
Figure 8:
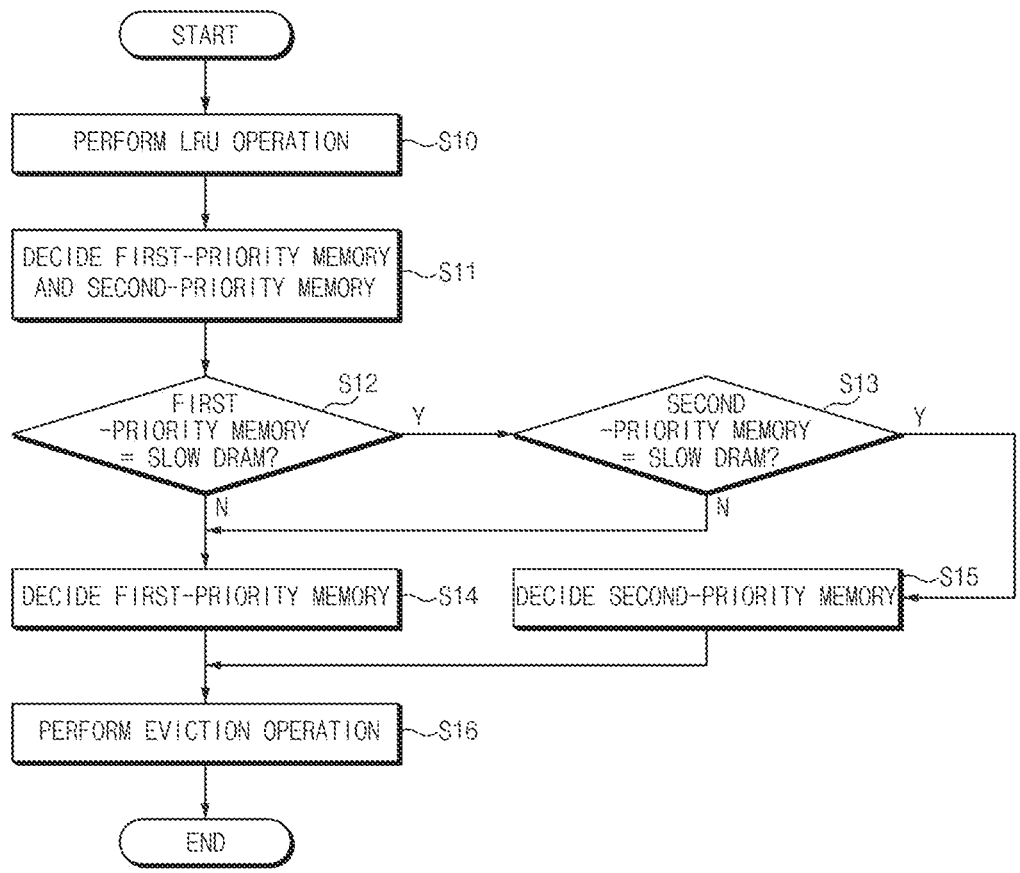

FIGS. 7 and 8 are flowcharts illustrating operations of the eviction circuit 214 shown in FIG. 6 according to an embodiment of the present disclosure. For convenience of description, the examples shown in FIGS. 7 and 8 illustrate an embodiment in which memories 420 are DRAMs. In addition, the examples of FIGS. 7 and 8 illustrate that the data processor 213 replaces cache data using the LRU operation.

As described above, the memories 420 may have different data access speeds according to either a relative position between the CPU 210A and the memories 420 or a temperature environment of the memories 420, such that the respective memories 420 may have different characteristics. In accordance with an embodiment, information about characteristics of the respective memories 420 may be stored in the characteristic storage circuit 215. The eviction circuit 214 may determine priority information of the respective memories, such that the eviction circuit 214 can perform eviction of the cache line according to not only the determined priority information, but also information stored in the characteristic storage circuit 215.

For example, a memory having fast characteristics (FF) may have a different miss penalty from a memory having slow characteristics (SS). For example, the FAST memory may have a lower miss penalty than the other SLOW memory.

In this case, the miss penalty may represent a time to be consumed to perform a line-fill operation caused by occurrence of a missed cache. In more detail, the line-fill operation may indicate that a cache memory accesses an external main memory due to occurrence of at least one missed cache, such that the corresponding line of the cache memory is filled with data stored in the main memory. Since an access time of the FAST memory is faster than an access time of the other SLOW memory, it is possible to reduce a miss penalty by using the FAST memory first to perform the eviction operation.

Accordingly, an eviction operation may first be performed in the FAST memory, such that data having a low miss penalty may be stored in the cache memory 220A.

FIG. 7 is a flowchart illustrating a process in which the eviction circuit 214 searches for a memory in which data eviction will be first carried out and an LRU operation is then performed in the corresponding memory.

Referring to FIG. 7, the eviction circuit 214 may determine the presence or absence of a FAST DRAM region in the cache memory based on characteristic information stored in the characteristic storage circuit 215 in step S1. If the FAST DRAM region is present in the cache memory in step S1, this FAST DRAM region may be determined to be an eviction block. The eviction circuit 214 may perform the LRU operation within the FAST DRAM region through the data processor 213 in step S2. The eviction circuit 214 may perform eviction of cache data according to the LRU operation in step S4. In contrast, if the FAST DRAM region is not present in the cache memory in step S1, i.e., a SLOW DRAM region is determined to exist in the cache memory in step S1, the SLOW DRAM region may be designated as an eviction block. The eviction circuit 214 may perform the LRU operation through the data processor 213 within the SLOW DRAM region in step S3. Thereafter, the eviction circuit 214 may perform eviction of cache data according to the LRU operation in step S4.

FIG. 8 is a flowchart illustrating that the LRU operation is first performed and a memory in which data eviction will be performed is searched for by the eviction circuit 214.

Referring to FIG. 8, the eviction circuit 214 may perform the LRU operation through the data processor 213 in step S10. Thereafter, the eviction circuit 214 may determine priority information for a memory in which data eviction will be carried out, based on characteristic information stored in the characteristic storage circuit 215 in step S11.

Thereafter, the eviction circuit 214 may determine whether a first-priority memory in which data eviction will be first carried out is a SLOW DRAM in step S12. If the first-priority memory is determined to be the SLOW DRAM in step S12, the eviction circuit 214 may determine whether a second-priority memory is a SLOW DRAM in step S13.

If the first-priority memory is not the SLOW DRAM in step S12, the eviction circuit 214 may determine a FAST DRAM to be the first-priority memory. In more detail, the eviction circuit 214 may compare miss penalty values of FAST DRAMs with each other, may determine one FAST DRAM having a lower miss penalty from among multiple FAST DRAMs to be the first-priority memory in step S14, and may perform eviction of at least one cache line within the determined first-priority memory in step S16.

Although the first-priority memory is the SLOW DRAM and the second-priority memory is not the SLOW DRAM, the priority order is changed such that the FAST DRAM may be determined to be the first-priority memory. Although the FAST DRAM is not the first-priority memory, the priority order of the FAST DRAM may be changed to the first-priority memory, such that the eviction operation can first be carried out in the FAST DRAM. That is, miss penalty values of FAST DRAMs may be compared with each other, any FAST DRAM having a lower miss penalty may be determined to be the first-priority memory in step S14, and eviction of the cache line may be carried out in the determined first-priority memory in step S16.

In contrast, when the first-priority memory and the second-priority memory are SLOW DRAMs, a FAST DRAM may be determined to be the second-priority memory instead of the SLOW DRAM determined to the second-priority memory. In other words, miss penalty values of FAST DRAMs may be compared with each other, such that any FAST DRAM having a lower miss penalty may be determined to be the second-priority memory in step S15, and eviction of the cache line may be carried in the determined second-priority memory in step S16.

As is apparent from the above description, the data processing system according to the embodiments of the present disclosure may determine an eviction block in consideration of memory characteristics during cache management, resulting in reduction in a miss penalty.

Those skilled in the art will appreciate that the embodiments may be carried out in other specific ways than those set forth herein without departing from the spirit and essential characteristics of the disclosure. The above embodiments are therefore to be construed in all aspects as illustrative and not restrictive. The scope of the disclosure should be determined by the appended claims and their legal equivalents, not by the above description. Further, all changes coming within the meaning and equivalency range of the appended claims are intended to be embraced therein. In addition, it is obvious to those skilled in the art that claims that are not explicitly cited in each other in the appended claims may be presented in combination as an embodiment or included as a new claim by a subsequent amendment after the application is filed.

Although a number of illustrative embodiments have been described, it should be understood that numerous other modifications and embodiments can be devised by those skilled in the art that will fall within the spirit and scope of the principles of this disclosure. Particularly, numerous variations and modifications are possible in the component parts and/or arrangements which are within the scope of the disclosure, the drawings and the accompanying claims. In addition to variations and modifications in the component parts and/or arrangements, alternative uses will also be apparent to those skilled in the art.

What is claimed is:

1. A data processing system comprising:
   a compute blade configured to generate a write command to store data and a read command to read the data; and
   a memory blade configured to selectively perform read and write operations in response to the read and write commands in a plurality of memories,
   wherein the compute blade has a cache memory that stores information about performance characteristics of each of the plurality of memories, and is configured to determine priority information of a memory to which an eviction operation of a cache line is performed based on the performance characteristics,
   wherein the cache memory includes:
   a way block configured to store cached data for a central processing unit (CPU);
   a data processor configured to process the cached data to perform the eviction operation of the cache line;
   a characteristic storage circuit configured to store the performance characteristics; and
   an eviction circuit configured to determine the priority information of the memory based on the performance characteristics, and to perform the eviction operation on the way block corresponding to the memory according to the determined priority information,
   wherein the system determines the priority information of the memory after the data processor processes the cached data that is to perform the eviction operation, and
   wherein, when memories having a slow data access speed are respectively determined to be a first-priority memory and a second-priority memory, the eviction circuit allocates a second priority to a memory having a fast data access speed such that the memory having the fast data access speed is changed to the second-priority memory.

2. The data processing system according to claim 1, further comprising:
   an interconnect blade configured to communicate data between the compute blade and the memory blade.

3. The data processing system according to claim 1, wherein the memory blade includes:
   the plurality of memories in which the read operation and the write operation are performed; and
   a controller configured to selectively access the plurality of memories in response to a request received from the compute blade.

4. The data processing system according to claim 3, wherein the controller includes:
   a data controller configured to control data that is communicated between the compute blade and the plurality of memories;
   a plurality of memory controllers configured to control communication of the data between the data controller and the plurality of memories; and
   an input/output (I/O) interface that is an interface between the data controller and the compute blade.

5. The data processing system according to claim 4, wherein:
   in response to the write command, the data controller receives data to be written from the compute blade and writes the received data in a first memory from among the plurality of memories; and
   in response to the read command, the data controller reads data stored in a second memory from among the plurality of memories and outputs the read data to the compute blade.

6. The data processing system according to claim 1, wherein the plurality of memories includes:
   a first-group memory in a first temperature environment;
   a second-group memory in a second temperature environment; and
   a third-group memory in a third temperature environment,
   wherein the second temperature is lower than the first temperature and the third temperature is lower than the second temperature.

7. The data processing system according to claim 6, wherein the first-group memory, the second-group memory, and the third-group memory are the same kind of memories.

8. The data processing system according to claim 6, wherein the plurality of memories have different performance characteristics.

9. The data processing system according to claim 6, wherein:
   the first-group memory has a first access speed;
   the second-group memory has a second access speed faster than the first access speed; and
   the third-group has a third access speed faster than the second access speed.

10. The data processing system according to claim 1, wherein the compute blade includes:

the central processing unit (CPU) configured to generate a command to control the memory blade;

the cache memory configured to store the cached data for the central processing unit (CPU) in a cache line; and an input/output (I/O) interface between the central processing unit (CPU) and the memory blade.

11. The data processing system according to claim 1, wherein the cache memory further includes:

an address decoder configured to decode an address received from the central processing unit (CPU).

12. The data processing system according to claim 1, wherein the data processor replaces the cached data using a Least Recently Used (LRU) operation.

13. The data processing system according to claim 1, wherein the data processor replaces the cached data using a First-In First-Out (FIFO) operation.

14. The data processing system according to claim 1, wherein the performance characteristics include any one of a data access speed, a refresh period, and an on-chip leakage amount.

* * * * *